(12) United States Patent
Owen (10) Patent No.: US 7,743,593 B2
(45) Date of Patent: Jun. 29, 2010

(54) PNEUMATIC COTTON HARVESTING MACHINE

(76) Inventor: Thomas Owen, 302 S. Mill St., Seven Mile, OH (US) 45062

( * ) Notice: Subject to any disclaimer, the term of this patent is extended or adjusted under 35 U.S.C. 154(b) by 0 days.

(21) Appl. No.: 12/566,272

(22) Filed: Sep. 24, 2009

(65) Prior Publication Data

US 2010/0071334 A1   Mar. 25, 2010

Related U.S. Application Data

(60) Provisional application No. 61/099,692, filed on Sep. 24, 2008.

(51) Int. Cl.
*A01D 46/08* (2006.01)
(52) U.S. Cl. .................... 56/31; 56/30; 56/32
(58) Field of Classification Search .............. 56/31, 56/32, 30, 28, 13.1, 12.9, 13.2, 36, 48
See application file for complete search history.

(56) References Cited

U.S. PATENT DOCUMENTS

| | | | |
|---|---|---|---|
| 793,210 A | 6/1905 | Morava | |
| 858,371 A | 7/1907 | Corley | |
| 1,225,193 A | 5/1917 | Vittetoe | |
| 2,702,976 A | 3/1955 | Diserens | |
| 2,798,351 A | 7/1957 | Altemus | |
| 2,817,939 A | 12/1957 | Graham et al. | |
| 2,836,951 A | 6/1958 | Annis | |
| 2,896,398 A * | 7/1959 | Green | 56/48 |
| 3,035,387 A | 5/1962 | Bevill | |
| 3,212,247 A | 10/1965 | Erickson | |
| 3,352,092 A * | 11/1967 | Hubbard | 56/13.2 |
| 3,373,547 A * | 3/1968 | Hubbard | 56/44 |
| 3,410,066 A | 11/1968 | Boynton et al. | |
| 3,421,301 A | 1/1969 | Boynton et al. | |
| 4,249,365 A * | 2/1981 | Hubbard et al. | 56/13.2 |
| 4,482,145 A | 11/1984 | Feldkamper et al. | |
| 4,501,112 A * | 2/1985 | Thedford et al. | 56/13.3 |
| 4,821,497 A * | 4/1989 | Deutsch et al. | 56/41 |
| 4,928,459 A * | 5/1990 | Thedford et al. | 56/13.3 |
| 6,205,756 B1 * | 3/2001 | Orsborn et al. | 56/30 |
| 6,907,718 B2 * | 6/2005 | Haverdink | 56/13.1 |
| 2006/0162307 A1 | 7/2006 | Thompson | |

* cited by examiner

*Primary Examiner*—Árpád Fábián-Kovács
(74) *Attorney, Agent, or Firm*—Berenato & White, LLC (57) ABSTRACT

A cotton picking machine comprises a chassis for moving the machine in a traveling direction, a vacuum pump provided to create a predetermined vacuum and a cotton picking unit including a cotton picking head supported by the chassis. The cotton picking head includes upper and lower vacuum compartments both in fluid communication with the vacuum pump and connecting tubes vertically extending between the upper and lower vacuum compartments and movable along a predetermined endless path so as to be in sliding contact with the upper and lower vacuum compartments at the corresponding distal ends thereof. Each of the connecting tubes includes a set of hollow picking fingers radially outwardly extending therefrom. The predetermined endless path includes an extracting zone and an inoperative zone. The connecting tubes fluidly connect the upper and lower vacuum compartments only when the connecting tubes pass the extracting zone of the predetermined endless path.

20 Claims, 9 Drawing Sheets

PNEUMATIC COTTON HARVESTING MACHINE

CROSS-REFERENCE TO RELATED APPLICATION

This Application claims the benefit under 35 U.S.C. 119(e) of U.S. Provisional Application Ser. No. 61/099,692 filed Sep. 24, 2008 by Owen, T., which is hereby incorporated herein by reference in its entirety and to which priority is claimed.

BACKGROUND OF THE INVENTION

1. Field of the Invention

The present inventions relates to agricultural implements for harvesting cotton in general and more particularly to a pneumatic machine for harvesting cotton.

2. Description of the Prior Art

Efforts have been made for many years to build cotton harvesting machines which can harvest cotton fiber (cotton balls) from cotton plants as efficiently and cleanly as manual labor but at a higher speed and lower cost. It is known in the prior art to utilize vacuum air suction for harvesting cotton balls. However, the known cotton picking machine using vacuum air suction, are not selective and as such they collect anything from the cotton plants that is sufficiently loose, such as sticks, leaves, dirt particles, etc. As a result, the cotton harvested by the conventional cotton picking machine using vacuum air suction, is dirty (dirt is mixed with the cotton fiber) and of lower quality than cotton picked by hand. The dirt is not removed during the ginning process and is baled and sold to customers in as is condition. Moreover, the conventional cotton picking machines drop approximately 10 to 20% of the cotton fiber to the ground during the picking process.

Therefore, the cotton picking machines are susceptible to improvements that may enhance their performance and cost. With this in mind, a need exists to develop an improved cotton picking (harvesting) machine with improved performance, inexpensive, and providing for more cost effective, efficient and low cost maintenance.

SUMMARY OF THE INVENTION

The present invention provides an improved cotton picking machine. The cotton picking machine according to the present invention comprises a chassis for moving the machine in a traveling direction, a vacuum pump provided to create a predetermined vacuum and a cotton picking unit including a cotton picking head supported by the chassis. The cotton picking head includes upper and lower vacuum compartments both in fluid communication with the vacuum pump and connecting tubes vertically extending between the upper and lower vacuum compartments and movable along a predetermined endless path so as to be in sliding contact with the upper and lower vacuum compartments at the corresponding distal ends thereof. Each of the connecting tubes includes a set of hollow picking fingers radially outwardly extending therefrom. The predetermined endless path includes an extracting zone and an inoperative zone. The connecting tubes fluidly connect the upper and lower vacuum compartments only when the connecting tubes pass the extracting zone of the predetermined endless path.

The cotton harvesting machine according to the present invention removes the cotton fibers from the plants in a completely dry condition eliminating the requirement of heating and removing the water and oil applied, for picking, by other cotton picking machines, unlike the existing machines. Moreover, the cotton harvesting machine of the present invention is relatively simple, inexpensive, and provides a more cost effective, efficient and low cost maintenance cotton harvesting machine.

BRIEF DESCRIPTION OF THE DRAWINGS

Other objects and advantages of the invention will become apparent from a study of the following specification when viewed in light of the accompanying drawings, wherein.

DESCRIPTION OF PREFERRED EMBODIMENTS

The preferred embodiment of the present invention will now be described with the reference to accompanying drawings.

For purposes of the following description, certain terminology is used in the following description for convenience only and is not limiting. The words "top", "bottom", "right", "left", "lower", "upper", "inner" and "outer" designate directions in the drawings to which reference is made. The words "uppermost" and "lowermost" refer to position in a vertical direction relative to a geometric center of the apparatus of the present invention and designated parts thereof. The terminology includes the words above specifically mentioned, derivatives thereof and words of similar import. Additionally, the word "a" as used in the claims means "at least one".

Figure 1:
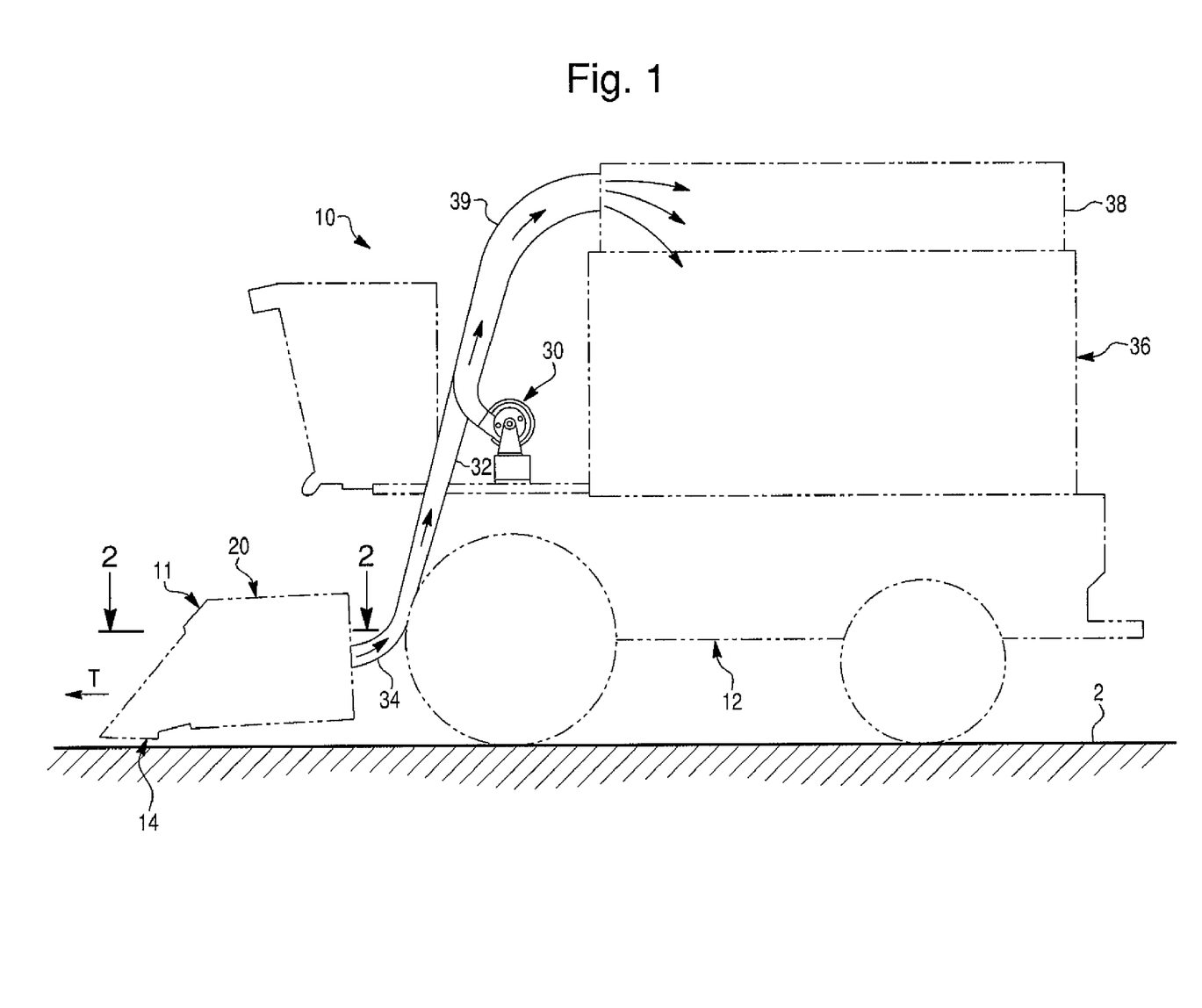
FIG. 1 is a schematic view of a cotton harvesting machine in accordance with the exemplary embodiment of the present invention.

FIG. 1 of the drawings illustrates the preferred exemplary embodiment of a self-propelled pneumatic cotton harvesting machine (or vehicle) 10 in accordance with the present invention. The cotton harvesting machine 10 comprises a vehicle chassis (including a frame) 12 for moving the cotton harvesting machine 10 across a cotton field (ground) 2 in a traveling direction T (shown in FIGS. 1, 2, 4, 5, 8 and 9), a cotton picking device generally denoted with the reference numeral 11 in FIGS. 1 and 2, mounted to the chassis 12, and a source of vacuum (negative air pressure), such as a motor driven vacuum pump (suction fan) 30 supported by the chassis 12 and provided to create a predetermined vacuum (shown in FIGS. 1 and 10).

The cotton picking device 11 includes a guide device 14, and a cotton picking unit 20 associated with the guide device 14. It will be appreciated that the cotton picking device 11 of the cotton harvesting machine 10 may include one or more guide devices 14 and one or more of the associated cotton picking units 20. Both the guide device 14 and the associated cotton picking unit 20 are supported by (mounted to) the chassis 12. Preferably, the guide device 14 includes first and second guide elements $15_1$ and $15_2$, respectively, positioned at the front of the cotton picking unit 20. The first and second cot guide elements $15_1$ and $15_2$ are substantially structurally identical in this embodiment.

Figure 2:
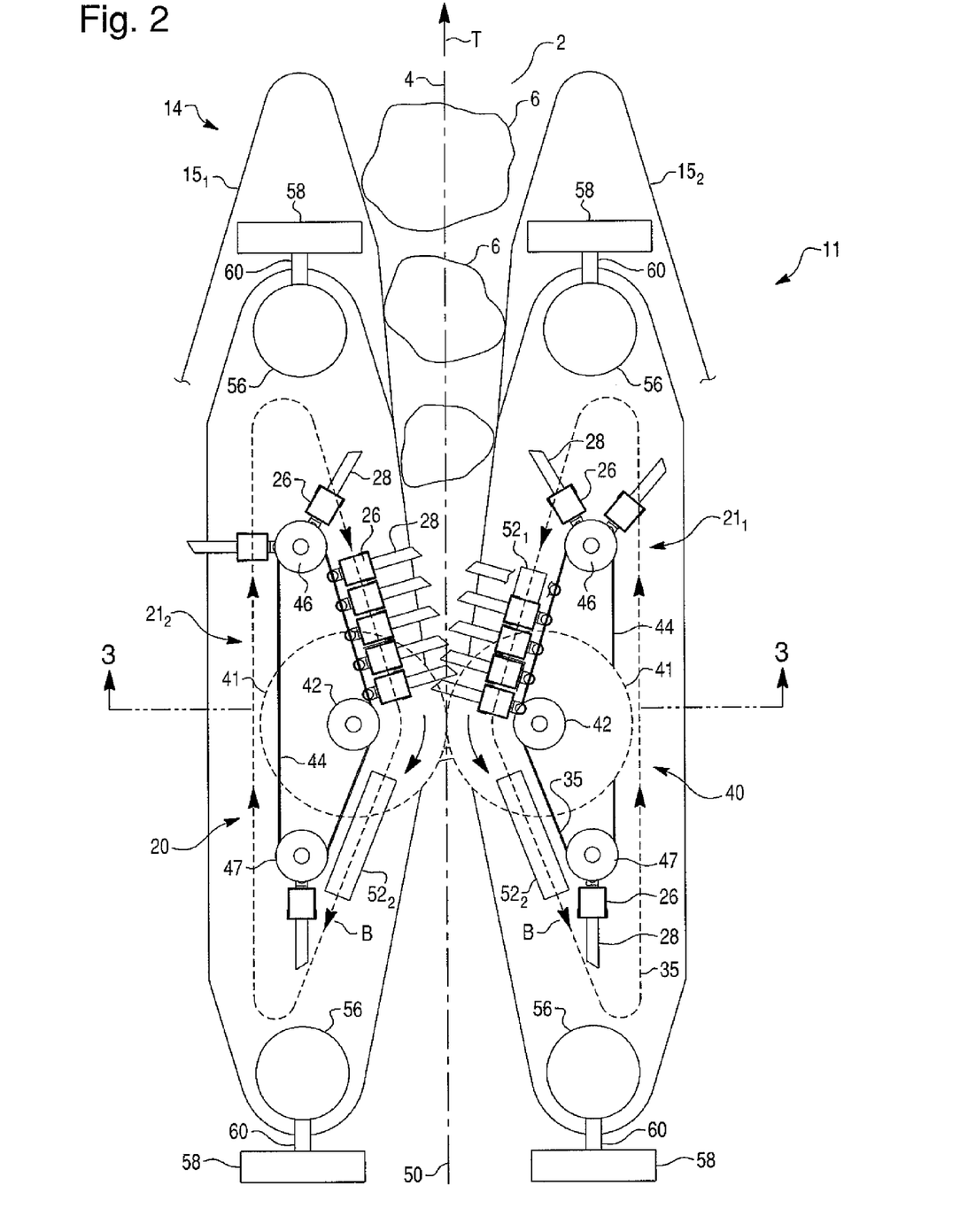
FIG. 2 is a top view of a cotton picking device including a cotton picking unit in accordance with the exemplary embodiment of the present invention taken along the line 2-2 in FIG. 1.
Figure 3:
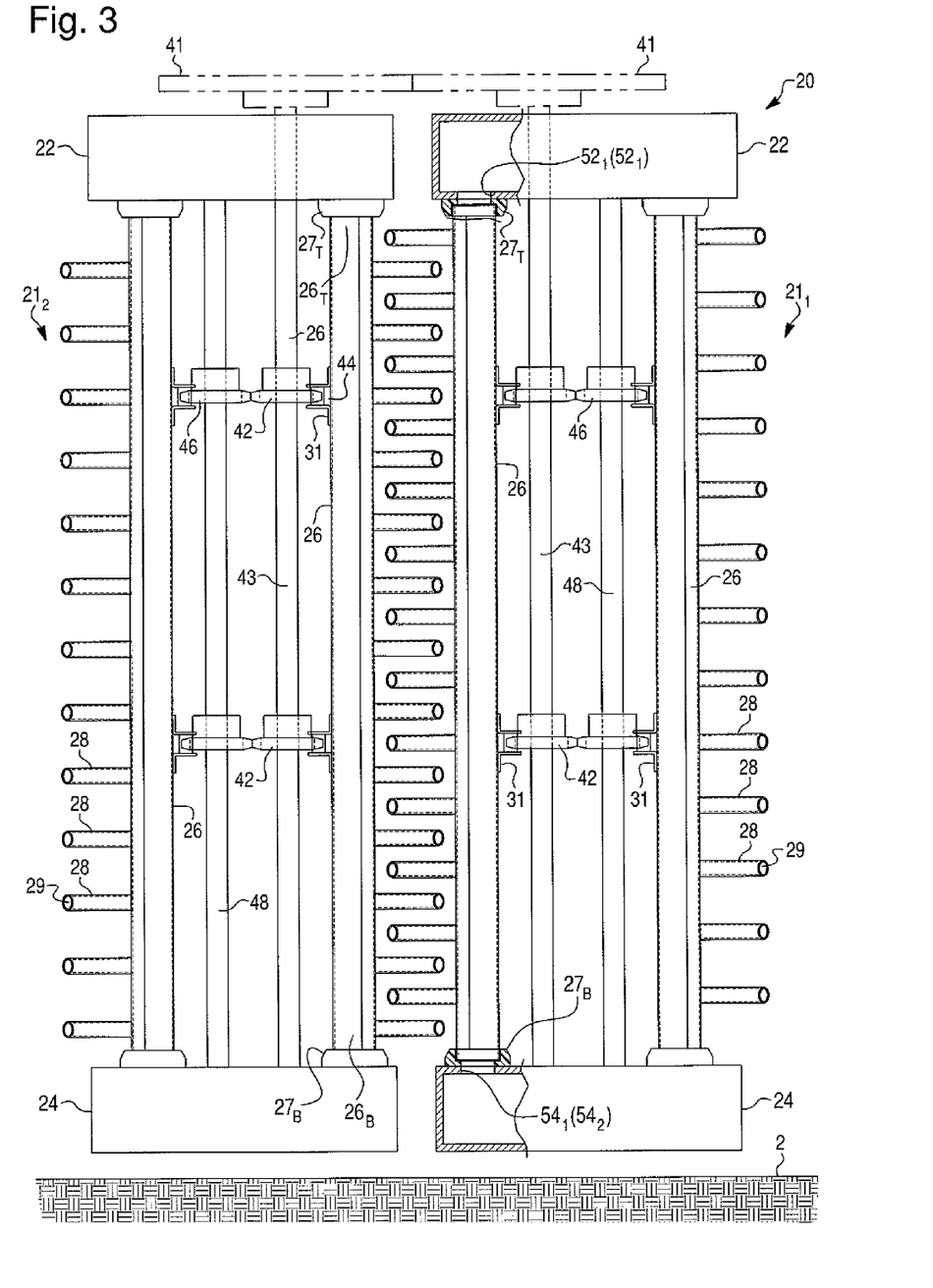
FIG. 3 is a partial sectional view of the cotton picking unit in accordance with the exemplary embodiment of the present invention taken along the line 3-3 in FIG. 2.

The cotton picking unit 20 includes one or a pair of cotton picking heads. Preferably, as illustrated in FIGS. 2 and 3, the cotton picking unit 20 includes first and second cotton picking heads $21_1$ and $21_2$, respectively, supported by (mounted to) the chassis 12 and disposed laterally opposite each other in the direction perpendicular to the traveling direction T so that cotton stalks (plants) 6 of a cotton row 4 pass between the cotton picking heads $21_1$ and $21_2$ as the cotton picking machine 10 moves through the cotton field 2 (as illustrated in FIG. 2). The opposite first and second cotton picking heads $21_1$ and $21_2$ define a center line 50 of the cotton picking unit 20 disposed equidistantly between the first and second cotton picking heads $21_1$ and $21_2$ and extending in the traveling direction T. The first and second cotton picking heads $21_1$ and $21_2$ are substantially structurally identical in this embodiment. In view of these similarities, and in the interest of simplicity, the following discussion at times will use a reference numeral without a letter to designate an entire group of substantially identical structures. For example, the reference numeral 21 will be used when generically referring to each of the first and second cotton picking heads $21_1$ and $21_2$ rather than reciting all two reference numerals. Alternatively, the cotton picking unit 20 may include only one cotton picking head.

A pair of the guide elements $15_1$ and $15_2$ of the guide device 14 is positioned in front of the cotton picking unit 20 and is adapted to maintain the cotton stalks 6 of the cotton row 4 in a generally upright position and to guide the cotton stalks 6 of the cotton row between the cotton picking heads $21_1$ and $21_2$ of the cotton picking unit 20 as the cotton picking machine 10 moves through the cotton field 2. In operation, when the cotton harvesting machine 10 is moving forward, the guide elements $15_1$ and $15_2$ of the guide device 14 lift and gather branches of the cotton stalks (plants) 6 and bring them into an upright position and a relatively compact state so that the cotton picking unit 20 moves by the row 4 of the cotton plants 6 in the close vicinity thereto for removing the cotton therefrom. The cotton removed from the cotton stalks 6 by the cotton picking unit 20 is carried by continuous flows of air through an outlet duct 39 extending from the vacuum pump 30 upwardly and rearwardly to a trailer (not shown) pulled behind the cotton harvesting machine 10 or to a cotton receiving basket 36 mounted on the chassis 12 of the cotton harvesting machine 10 through a trash separator 33 and a cotton gin 38.

Figure 10:
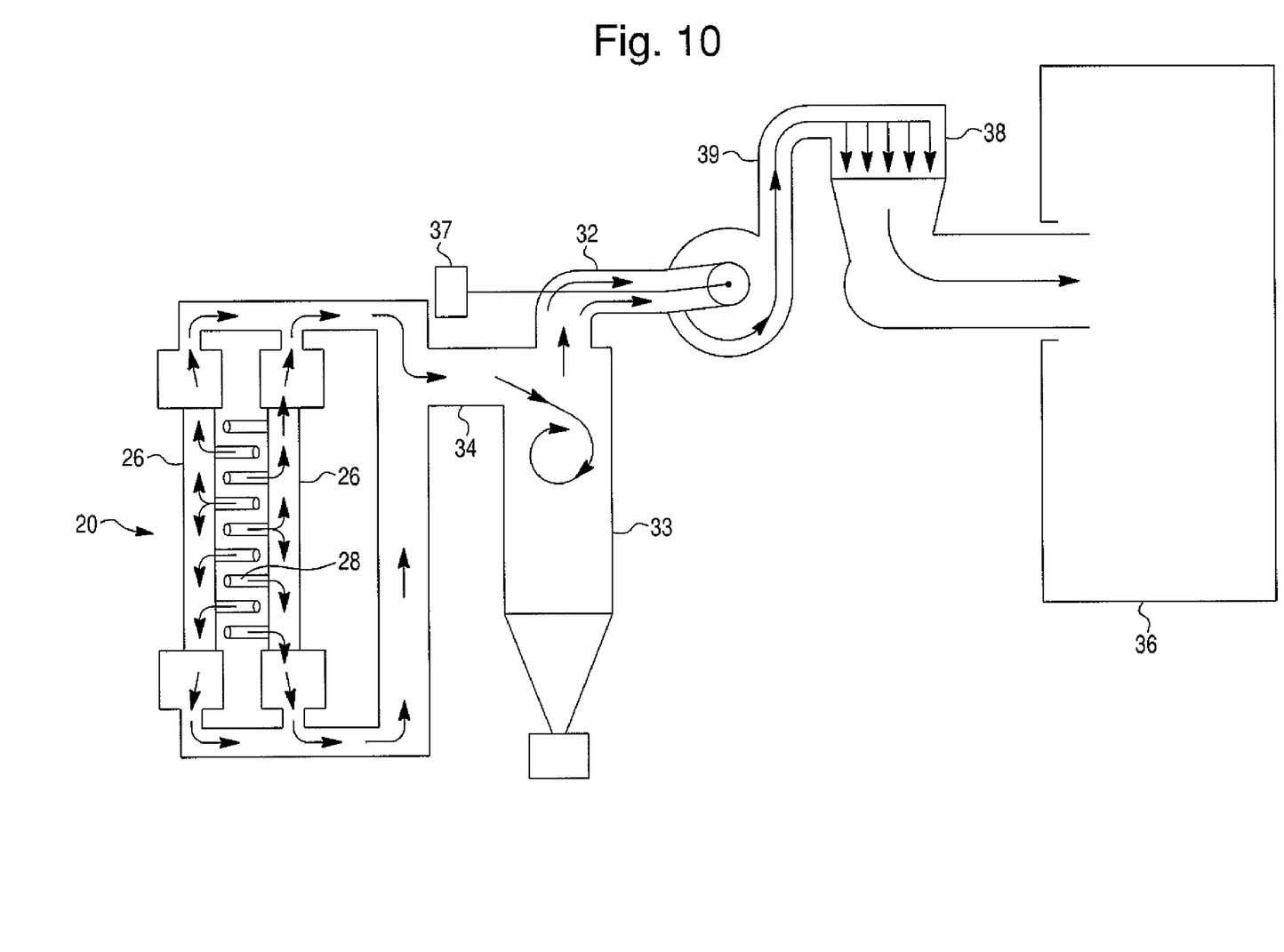
FIG. 10 is a schematic view of a vacuum suction system of the cotton picking unit in accordance with the exemplary embodiment of the present invention.

Preferably, the first and second cotton picking heads $21_1$ and $21_2$ of the cotton picking unit 20 are structurally substantially identical. Each of the first and second cotton picking heads 21 of the cotton picking unit 20, as illustrated in detail in FIGS. 2-5, 8 and 10, comprises an upper compartment 22 defining an upper vacuum chamber 23 and a lower compartment 24 defining a lower vacuum chamber 25 both in fluid communication with the vacuum pump 30 (as illustrated in FIG. 10). As further illustrated in FIGS. 3-5, 8 and 10, the upper vacuum chamber 23 is disposed above the lower vacuum chamber 24 and is spaced therefrom in vertical direction. Moreover, the upper and lower vacuum chambers 23, 25 are fluidly connected to each other by one or more vacuum pipes (hoses) 56, which are, in turn, fluidly connected to a vacuum manifold 32 of the vacuum pump 30 through one or more vacuum pipes (hoses) 34.

Figure 4:
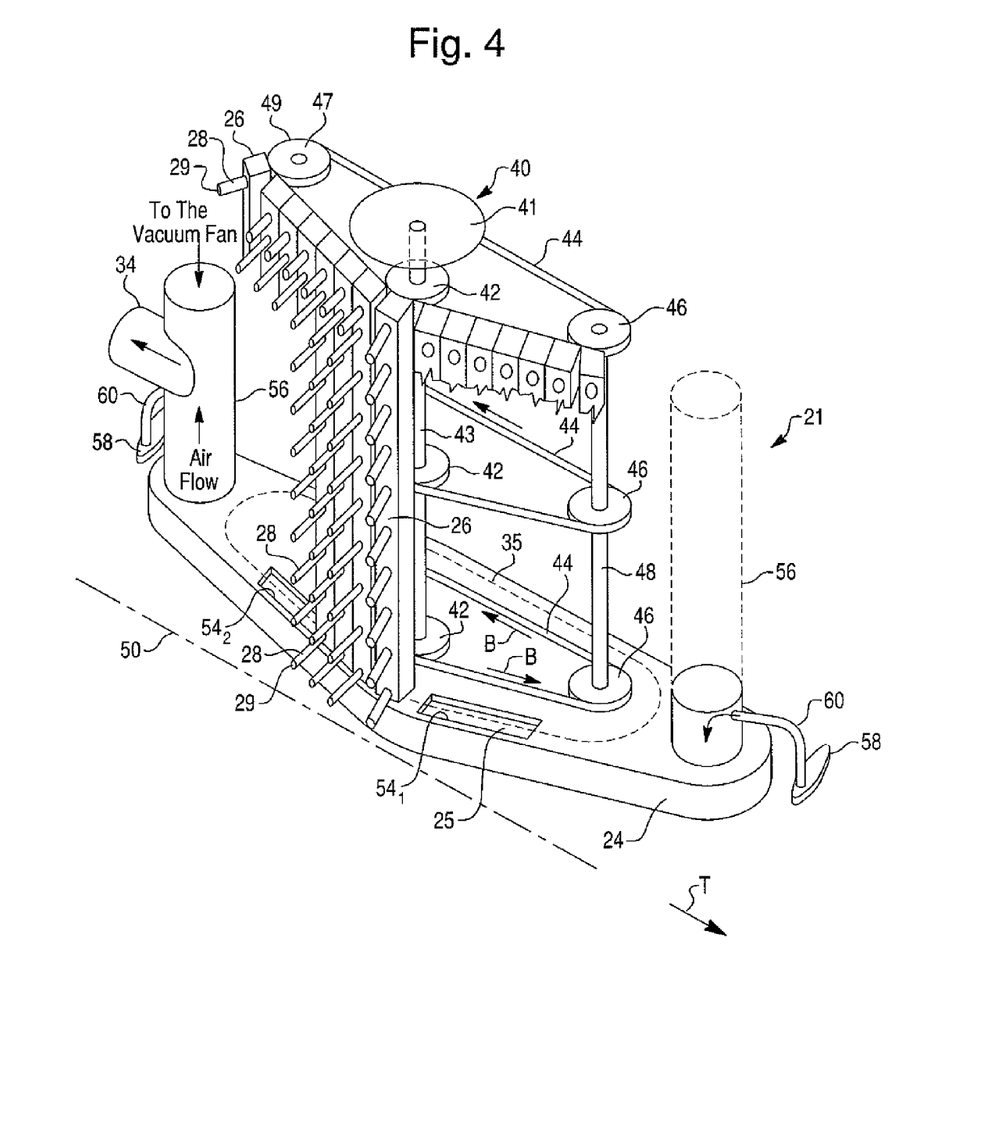
FIG. 4 a partial perspective view of a cotton picking head in accordance with the exemplary embodiment of the present invention.
Figure 7:
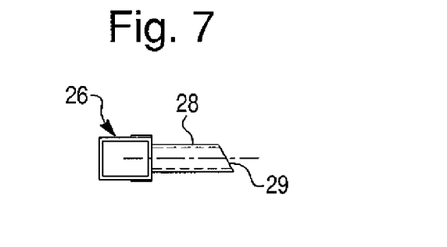
FIG. 7 is a sectional view of the hollow connecting tub of the cotton picking head taken along the line 7-7 in FIG. 6.

Each of the first and second cotton picking heads 21 of the cotton picking unit 20 further comprises a plurality of vertically mounted hollow, open ended connecting tubes 26 extending between the upper and lower vacuum compartments 22 and 24. Preferably, as illustrated in FIGS. 2, 4 and 7, the connecting tubes 26 have a square cross-section. It will be appreciated that the connecting tubes with any other appropriate cross-section, such as circular, rectangular, etc., are within the scope of the present invention. Each of the hollow connecting tubes 26, as illustrated in FIGS. 2-7 and 10, is provided with a set of substantially identical hollow picking (suction) fingers 28 attached thereto and radially outwardly extending therefrom along the length thereof at intervals top to bottom and along the length of the tube 26. Preferably, the hollow picking fingers 28 are substantially perpendicular to the hollow connecting tube 26 (thus, parallel to each other) and are disposed equidistantly from each other. Each of the picking fingers 28 has an access opening 29 (shown in detail in FIG. 7) and is in fluid communication with the corresponding connecting tube 26. Preferably, the access opening of each of the picking fingers 28 is tapered and is provided at a distal end thereof. Further preferably, the picking fingers 28 of the first and second cotton picking heads $21_1$ and $21_2$ partially laterally (i.e., transversely, or in the direction perpendicular to the center line 50 of the cotton picking unit 20) overlap and are axially spaced from each other (as illustrated in FIG. 3). As further illustrated in FIGS. 3, 5 and 10, the picking fingers 28 of the first and second cotton picking heads $21_1$ and $21_2$ are disposed alternately and vertically spaced from each other.

The connecting tubes 26 are in sliding contact with the upper and lower vacuum compartments 22 and 24 at the distal ends of the connecting tubes 26 though top and bottom sliding seals $27_T$ and $27_B$, respectively, (shown in FIGS. 2-5) and are movable along a predetermined endless path 35 by a drive mechanism, preferably in the form of a drive mechanism 40 (shown in FIGS. 2-5, 8 and 9). The predetermined endless path 35 of the connecting tubes 26 includes an extracting zone (51a, 51b) and an inoperative zone 55. It should be understood that not all of the connecting tubes 26 are shown in the accompanying drawings in the interest of simplicity and clearness of understanding of the present invention. Preferably, the connecting tubes 26 are closely adjacent to each other along the predetermined endless path 35, as illustrated in the central section of the cotton picking heads 21 adjacent to the center line 50 of the cotton picking unit 20 of FIGS. 2 and 4.

According to the present invention, the connecting tubes 26 fluidly connect the upper and lower vacuum chambers 23, 25 only when the connecting tubes 26 pass the extracting zone of the predetermined endless path 35 so that cotton fibers extracted from the cotton plants 6 passing by the cotton picking head 24 and suctioned into the picking fingers 28 in close vicinity to the cotton plant 6, and from the picking fingers 28 into at least the upper vacuum chamber 23 or the lower vacuum chamber 25 when the connecting tube 26 is in the extracting zone due to a predetermined vacuum created by said vacuum pump in said upper and lower vacuum chambers. However, the connecting tubes 26 fluidly disconnect the upper and lower vacuum chambers 23, 25 only when the connecting tubes 26 pass the inoperative zone of the predetermined endless path 35. As shown in FIGS. 2, 4, 8 and 9, the extracting zones (51a, 51b) of the first and second cotton picking heads $21_1$ and $21_2$ face each other and are disposed closer to the center line 50 of the cotton picking unit 20 than the inoperative zones thereof 55.

Figure 8:
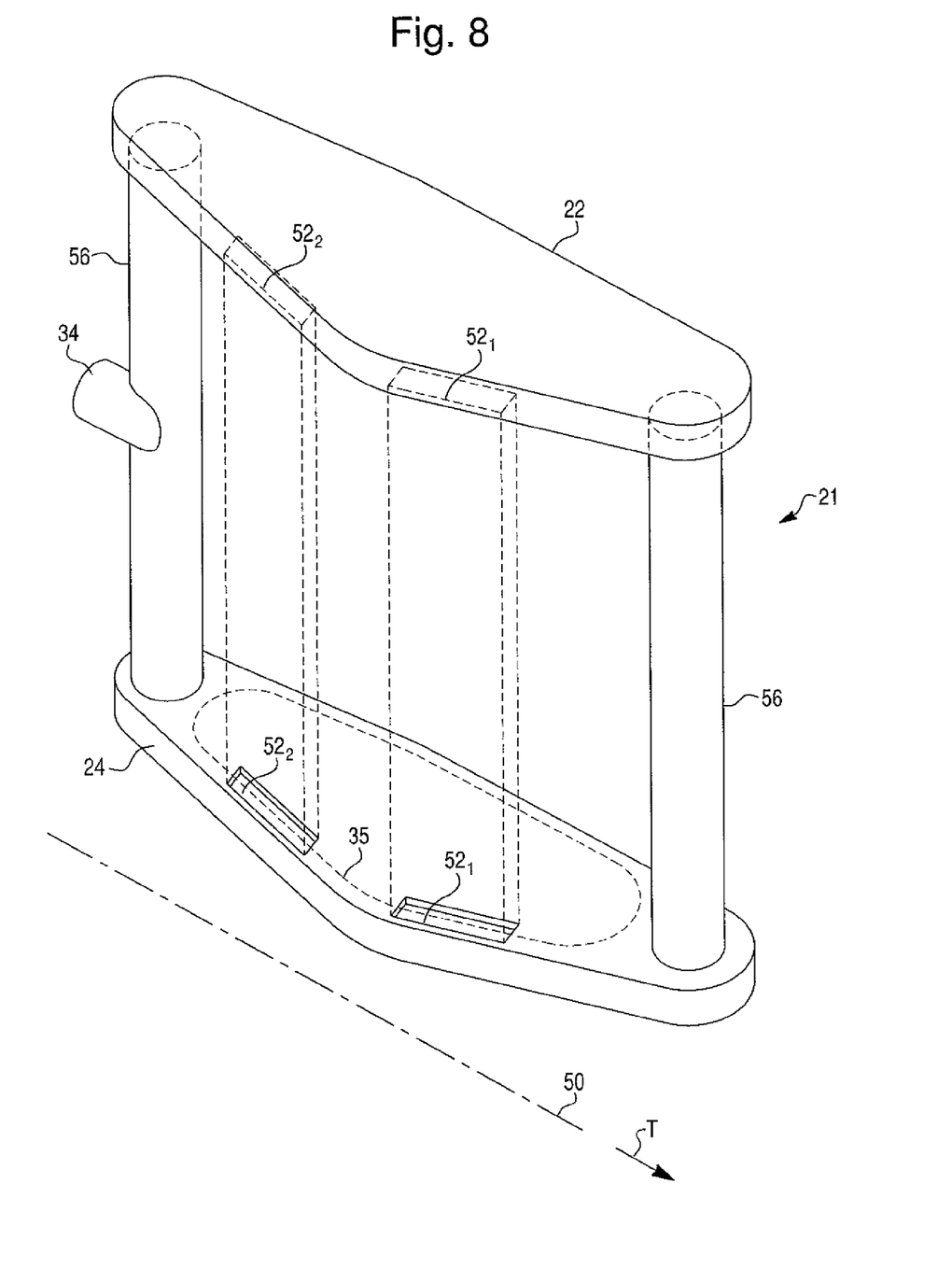
FIG. 8 a partial perspective view of the cotton picking head including upper and lower vacuum compartments thereof in accordance with the exemplary embodiment of the present invention.
Figure 9:
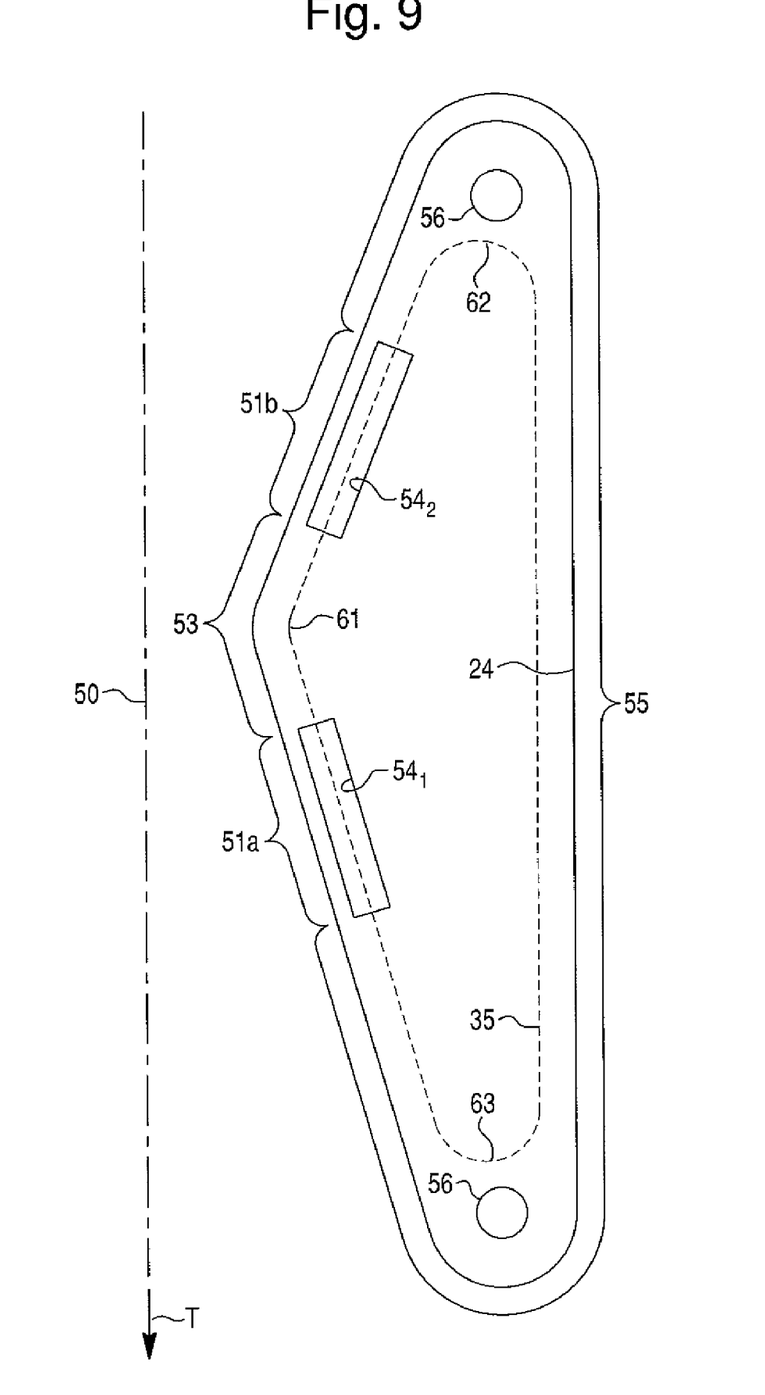
FIG. 9 is a top view of the lower vacuum compartment of the cotton picking head in accordance with the exemplary embodiment of the present invention.

More specifically, according to the preferred embodiment of the present invention, the extracting zone of the predetermined endless path 35 of the connecting tubes 26 includes first and second extracting zones 51a and 51b, respectively, spaced from each other by a separating zone 53 on one side of the endless path 35 and by the inoperative zone 55 on the other side of the endless path 35 (as shown in FIGS. 8 and 9). Accordingly, the connecting tubes 26 fluidly connect the upper and lower vacuum chambers 23, 25 only when the connecting tubes 26 pass the first extracting zone 51a or the second extracting zone 51b of the predetermined endless path 35 so that cotton fibers are extracted from the cotton plants 6 passing by the cotton picking head 21 and suctioned into the picking fingers 28 in close vicinity to the cotton plant 6, and from the picking fingers 28 into the upper vacuum chamber 23 or the lower vacuum chamber 25 when the connecting tube are in the first extracting zone 51a or the second extracting zone 51b due to the predetermined vacuum created by the vacuum pump 30 in the upper and lower vacuum chambers 23, 25. Consequently, the connecting tubes 26 fluidly disconnect the upper and lower vacuum chambers 23, 25 only when the connecting tubes 26 pass the inoperative zone 55 and/or the separating zone 53 of the predetermined endless path 35. As shown in FIGS. 2, 4, 8 and 9, the first and second extracting zones 51a, 51b of the cotton picking head 21 are disposed closer to the center line 50 of the cotton picking unit 20 than the inoperative zone thereof 55.

Further specifically, the upper vacuum compartment 22 of the cotton picking head 21 is provided with first and second elongated slots (openings therethrough) $52_1$ and $52_2$, respectively, each longitudinally extending along a portion of the predetermined endless path 35, while the lower vacuum compartment 24 of the cotton picking head 21 is provided with first and second elongated slots (openings therethrough) $54_1$ and $54_2$, respectively, each longitudinally extending along a portion of the predetermined endless path 35. The first slots $52_1$ and $54_1$ of the upper and lower vacuum compartments 22 and 24, respectively, define the first extracting zone 51a of the predetermined endless path 35, while the second slots $52_2$ and $54_2$ of the upper and lower vacuum compartments 22 and 24, respectively, define the second extracting zone thereof so that when an open top end $26_T$ of each of the connecting tubes 26 registers with the first or second slots ($52_1$ or $52_2$) in the upper vacuum compartment 22, an open bottom end $26_B$ thereof registers with corresponding one of the first or second slots ($54_1$ or $54_2$) in the lower vacuum compartment 24 so as to provide fluid communication between the upper and lower vacuum chambers 22 and 24 through the connecting tube 26 passing through the first or second extracting zones (51a or 51b) of the predetermined endless path 35. In other words, when the drive mechanism 40 moves the hollow connecting tubes 26 along the endless path 35 relative to the upper and lower vacuum compartments 22 and 24, the successive hollow connecting tubes 26 become successively aligned (or registered) with the first slots $52_1$ and $54_1$ and the second slots $52_2$ and $54_2$ of the corresponding upper and lower vacuum chambers 22 and 24, thus fluidly connecting the picking fingers 28 with the upper and lower vacuum compartments 22 and 24.

As illustrated in FIG. 8, the first slots $52_1$ and $54_1$ as well as the second slots $52_2$ and $54_2$ of the corresponding upper and lower vacuum chambers 22 and 24 are geometrically and structurally similar, are spaced from each other in vertical direction, but are horizontally aligned in the direction of the predetermined endless path 35. In other words, the top end $26_T$ of each of the connecting tubes 26 registers with the first or second slots ($52_1$ or $52_2$) in the upper vacuum compartment 22 at the same time as the bottom end $26_B$ thereof registers with the corresponding first or second slots ($54_1$ or $54_2$) of the lower vacuum compartment 24. Moreover, as shown in FIGS. 2, 4, 8 and 9, the predetermined endless path 35 is substantially triangular in shape having apexes 61, 62 and 63 (shown in detail in FIG. 9). As further illustrated in FIG. 9, the innermost apex 61 of the predetermined endless path 35 is adjacent to the center line 50 of the cotton picking unit 20 (i.e., the innermost apex 61 is disposed closer to the center line 50 than the remaining apexes 62 and 63). Accordingly, the portion of the predetermined endless path 35 at the innermost apex 61 (or including the innermost apex 61) between the first slot ($52_1$ or $54_1$) and the second slot ($52_2$ or $54_2$) defines the separating zone 53 of the predetermined endless path 35, while the portion of the predetermined endless path 35 including the apexes 62 and 63 remote from the center line 50 of the cotton picking unit 20 defines the inoperative zone 55 of the predetermined endless path 35.

Figure 5:
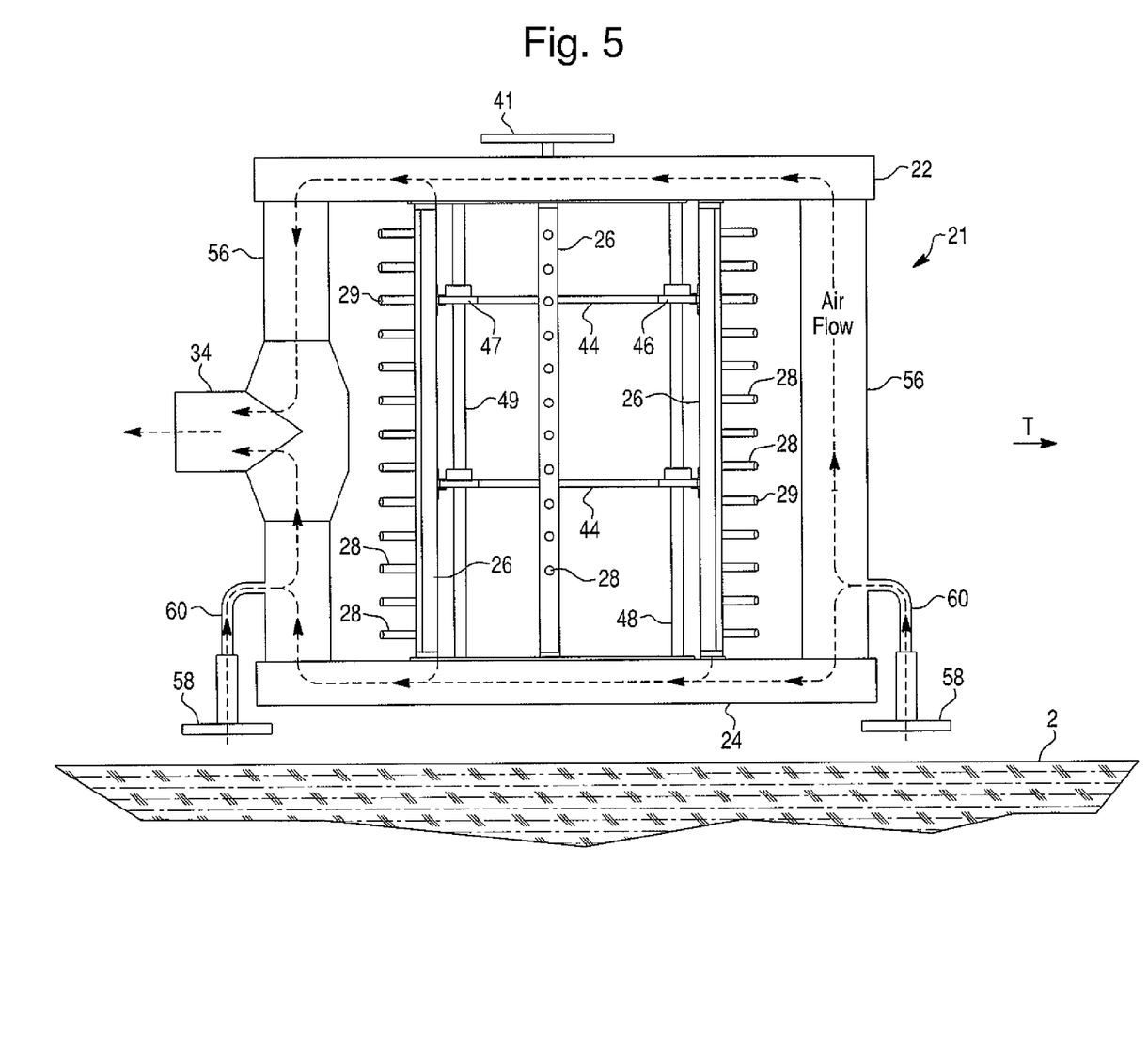
FIG. 5 is a side view of the cotton picking head in accordance with the exemplary embodiment of the present invention.
Figure 6:
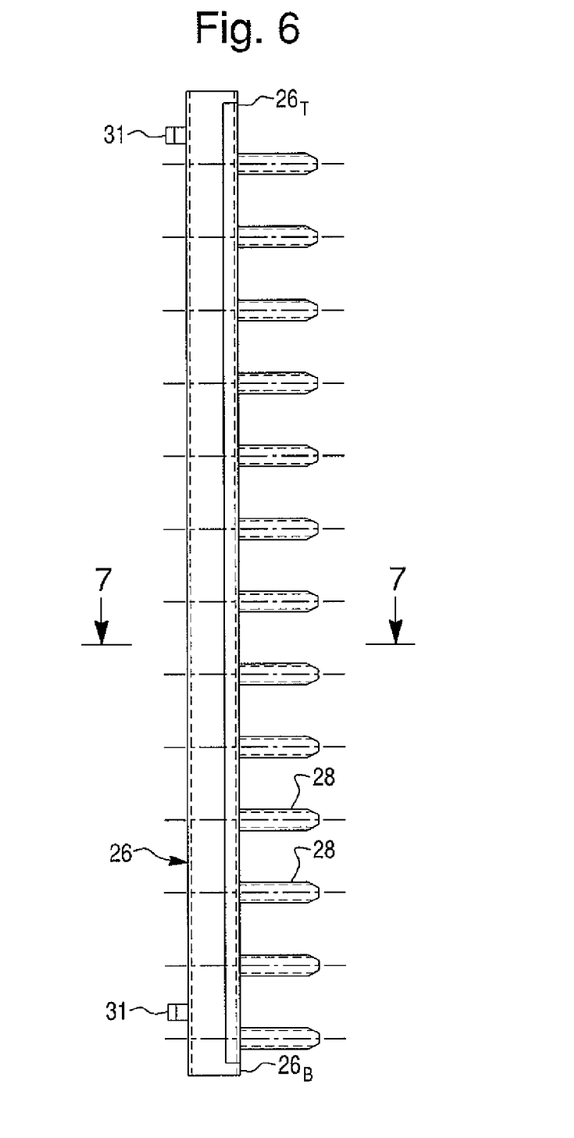
FIG. 6 is a sectional view of a hollow connecting tube of the cotton picking head in accordance with the exemplary embodiment of the present invention.

Preferably, the cotton picking head 21 further includes structurally substantially identical front and rear cotton sweeper heads 58 (shown in FIGS. 2, 4 and 5), provided to pick-up any cotton fibers (balls) fallen to the cotton field (ground) 2. Each of the cotton sweeper heads 58 is mounted to one of the vacuum pipes 56 fluidly connecting the upper and lower vacuum compartments 22, 24 (as illustrated in FIGS. 2, 4 and 5) or to the lower vacuum compartment 24 by a bent, hollow support tube 60. Preferably, the cotton sweeper head 58 is pivotally mounted to a distal end of the support tube 60, while a proximate end of the support tube 60 is attached to the vacuum pipe 56 so as to fluidly connect the cotton sweeper head 58 to the vacuum pipe 56.

The upper and lower vacuum compartments 22 and 24 are under a high pressure vacuum created by the motor driven vacuum pump (suction fan) 30, shown in FIGS. 1 and 10. It is well known in the art that the vacuum pump is a device that removes gas molecules from a sealed volume in order to leave behind a partial vacuum. In other words, the vacuum pump 30 creates a predetermined vacuum in a vacuum manifold 32 which fluidly communicates with the vacuum pipes (hoses) 34. It will be appreciated that the term "vacuum" is defined in the art and should be understand in the present application as an enclosed space from which matter, esp. air, has been partially removed so that the matter or gas remaining in the space exerts significantly less pressure than the atmosphere, or as a space in which the pressure is significantly lower than atmospheric pressure. It will be further appreciated that the vacuum pump 30 may be of any appropriate construction. As shown in FIG. 10, the vacuum pump 30 is a centrifugal pump driven by a driving motor 37. It will be appreciated that the vacuum pump 30 can be driven by a prime mover of the cotton harvesting machine 10. Alternatively, the vacuum pump 30 may include a plurality of fan units arranged in series coaxially with a driving motor. Each of the fan units may includes a set of rotatable fan blades and stationary vanes. Further preferably, each subsequent fan unit has an increasing number of the fan blades and stationary vanes. In turn, the vacuum pipes 34 are connected to the upper and lower vacuum compartments 22 and 24, thus creating vacuum at the open distal end 29 of the hollow picking fingers 28 of the hollow tubes 26 aligned with the first or second slots ($52_1$, $54_1$ and $52_2$, $54_2$) (shown in FIGS. 2-4 and 8-9) of the corresponding upper and lower vacuum compartments 22 and 24, i.e., when the connecting tube 26 are passing through the first or second extracting zones ($51a$ or $51b$) of the predetermined endless path 35.

The drive mechanism 40 comprises two roller-chain mechanisms one for each of the cotton picking head 21. Each of the roller-chain mechanisms includes a drive/timing gear 41 driven by the prime mover of the cotton harvesting machine 10 and driving a drive sprocket 42, an endless roller chain 44 driven by the drive sprocket 42, and driven sprockets 46 and 47. Both the drive/timing gear 41 and the drive sprockets 42 are non-rotatably mounted to a drive shaft 43 so that the drive sprocket 42 is driven by the drive/timing gear 41. Preferably, as illustrated in FIGS. 2-5, each of the roller-chain mechanisms includes three endless roller chains 44 and three drive sprockets 42 all non-rotatably mounted to the drive shaft 43 and driven by the drive/timing gear 41. Similarly, the three driven sprockets 46 are non-rotatably mounted to a driven shaft 48, and the three driven sprockets 47 are non-rotatably mounted to a driven shaft 49. As further shown in FIGS. 3 and 7, each of the hollow tubes 26 includes a set of chain engaging teeth 31 provided to be engaged by the endless roller chain 44 so as to move the hollow tubes 26 along the predetermined endless path 35. The chain engaging teeth 31 are attached to the hollow connecting tubes 26 at intervals from top to bottom thereof.

As shown in FIGS. 2 and 4, the connecting tubes 26 pass the first and second extracting zones $51a$ and $51b$ of the predetermined endless path 35 in the direction of the arrow B, while the cotton picking head 21, supported by the chassis 12, travels in the direction T opposite to the movement of the connecting tubes 26 adjacent to the cotton row 4. Moreover, the drive/timing gear 41 driven by the prime mover of the cotton harvesting machine 10 is timed and coordinated with a forward ground speed of the cotton harvesting machine 10 so that the hollow tubes 26 are configured to advance the hollow picking fingers 28 into the cotton stalks 6 so as to create a pattern of totally vacuuming entire cotton plant. Preferably, the drive mechanism 40 drives the endless roller chains 44 so that a linear speed of the connecting tubes 26 movable along the predetermined endless path in the extracting zone is equal to a linear speed of the cotton picking head 21 of the cotton picking machine 10 but in opposite directions. Subsequently, during cotton harvesting, when the cotton balls of the cotton stalks 6 come into range of the successive picking fingers 28 upon forward movement of the cotton picking head 21, there will be no relative movement between the picking fingers 28 of the particular connecting tube 26 and the cotton balls of the cotton stalk 6 engaged with the picking fingers 28 until the cotton picking head 21 passes the cotton stalks 6. Thus, the cotton balls of the cotton stalks 6 are exposed to significant air suction for a considerable period of time.

In operation, upon forward movement of the cotton picking machine 10, the guide elements $15_1$ and $15_2$ of the guide device 14 lift and gather branches of the cotton stalks (plants) 6 and bring them into an upright position and a relatively compact state so that the cotton picking unit 20 moves by the row 4 of the cotton plants 6 in the close vicinity thereto for removing the cotton therefrom.

As the cotton balls of the cotton stalks 6 come into range of the successive picking fingers 28 upon forward movement of the cotton picking head 21, the connecting tubes 26 carrying the successive picking fingers 28 move from the inoperative zone 55 to the first extracting zone $51a$ of the predetermined endless path 35 (i.e., the distal ends of the connecting tubes 26 engage the first slots $52_1$ and $54_1$ of the upper and lower vacuum compartments 22 and 24). As the connecting tubes 26 are passing the first extracting zone $51a$ (i.e., as the successive connecting tubes 26 go across the first slots $52_1$, $54_1$ of the corresponding upper and lower vacuum compartments 22 and 24 in the direction of the predetermined endless path 35), the cotton fibers (balls) are removed from the cotton stalks 6 by vacuum pressure at the distal end 29 of the picking fingers 28 and is sucked into the hollow picking fingers 28, then into the hollow connecting tubes 26 due to high vacuum created by the vacuum pump 30 at the distal end 29 of the picking fingers 28 when the successive hollow connecting tubes 26 pass through the first extracting zone $51a$ of the predetermined endless path 35, thus become aligned with the first slots $52_1$, $54_1$ of the corresponding upper and lower vacuum compartments 22 and 24. From the hollow tubes 26 the cotton fiber removed from the cotton stalks 6 is carried into the upper and/or lower vacuum compartments 22 and 24 through the slots the first slots $52_1$, $54_1$ therein.

Upon further movement of the connecting tubes 26 along the predetermined endless path 35, the successive connecting tubes 26 pass the separating zone 53, where no vacuum pressure is applied at the distal end 29 of the picking fingers 28 and no cotton fiber is sucked into the hollow picking fingers 28. As a consequence, the picking fingers 28 are cleaned in the separating zone 53 of the predetermined endless path 35.

Next, upon further movement of the connecting tubes 26 along the predetermined endless path 35, the successive connecting tubes 26 pass the second extracting zone $51b$ (i.e., the successive connecting tubes 26 go across the second slots $52_2$, $54_2$ of the corresponding upper and lower vacuum compartments 22 and 24 in the direction of the predetermined endless path 35), where the cotton fiber (balls) are again removed from the cotton stalks 6 by vacuum pressure at the distal end 29 of the picking fingers 28 and is sucked into the hollow picking fingers 28, then into the hollow connecting tubes 26 due to high vacuum created by the vacuum pump 30 at the distal end 29 of the picking fingers 28 when the successive hollow connecting tubes 26 pass through the second extracting zone $51b$ of the predetermined endless path 35, thus become aligned with the second slots $52_2$, $54_2$ of the corresponding upper and lower vacuum compartments 22 and 24. From the hollow tubes 26 the cotton fiber removed from the cotton stalks 6 is carried into the upper and/or lower vacuum compartments 22 and 24 through the slots the second slots $52_2$, $54_2$ therein. From the upper and lower vacuum compartments 22 and 24 the cotton fiber is carried by continuous flows of air through the vacuum pipes 34 and the outlet duct 39 extending from the suction fan 30 upwardly and rearwardly to the cotton receiving basket 36 mounted on the cotton harvesting machine 10. As further illustrated in FIG. 10, the cotton fiber removed from the cotton stalks 6 is carried to the cotton receiving basket 36 through the trash separator 33 for cleaning the harvested cotton from trash, debris and contaminants, and the cotton gin 38. It is well known in the art that the cotton gin is a machine that quickly and easily separates the cotton fibers from the seeds and thorns. These seeds are either used again to grow more cotton or, if badly damaged, are disposed of. Usually, the cotton gin uses a combination of a wire screen and small wire hooks to pull the cotton through the screen, while brushes continuously remove the loose cotton lint to prevent jams. Alternatively, the cotton fiber is carried by continuous flows of air through the outlet duct 39 rearwardly to a storage trailer (not shown) pulled behind the cotton harvesting machine 10. Preferably, the storage trailer has a movable partition that allows the machine operator to selectively compress the picked cotton to increase storage capacity of the trailer. The trailer is detachable from the cotton harvesting machine 10. The full trailer can be towed to the cotton gin and empty the trailer to continue the picking process. The trailer may have a fan for emptying the full unit at the cotton gin.

As the cotton balls of the cotton stalks 6 come out of range of the successive picking fingers 28 upon further forward movement of the cotton picking head 21, the connecting tubes 26 carrying the successive picking fingers 28 move from the second extracting zone 51b of the predetermined endless path 35 to the inoperative zone 55, where no vacuum pressure is applied at the distal end 29 of the picking fingers 28 and no cotton fiber is sucked into the hollow picking fingers 28.

The cotton harvesting machine according to the present invention has numerous advantages as compared to the existing machines. First, unlike the existing machines, the cotton fibers are removed from the plants in a completely dry condition eliminating the requirement of heating and removing the water and oil applied, for picking, by other cotton picking machines. Second, the cotton picking mechanism 20 of the present invention is simple and inexpensive, thus eliminating the costly, complicated and very high maintenance of other machines. Moreover, the hollow tube cotton picking mechanism of the present invention eliminates the twisting, tangling and wetting of the cotton fibers. The simple action of penetrating and withdrawing of the hollow picking fingers from the cotton plants eliminates the paddle wheel motion of some machines while attempting to pick the cotton fibers. Also, the cotton fibers are discharged from the vacuum pump, the trash separator and the cotton gin into a storage container. Therefore, a simple design of the cotton picking mechanism of the present invention provides a more cost effective, more efficient and low maintenance cotton harvesting machine.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed hereinabove was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A cotton picking machine, comprising:
   a chassis for moving said machine in a traveling direction;
   a vacuum pump supported by said chassis and provided to create a predetermined vacuum; and
   a cotton picking unit including a first cotton picking head supported by said chassis, said first cotton picking head including:
      an upper vacuum compartment and a lower vacuum compartment both in fluid communication with said vacuum pump, said upper and lower vacuum compartments spaced from each other in vertical direction; and
      a plurality of connecting tubes vertically extending between said upper and lower vacuum compartments, said connecting tubes movable along a predetermined endless path so as to be in sliding contact with said upper and lower vacuum compartments at the corresponding distal ends of said connecting tubes;
      each of said connecting tubes including a set of hollow picking fingers radially outwardly extending therefrom along the length thereof at intervals from top to bottom;
      each of said picking fingers having an access opening and being in fluid communication with the corresponding connecting tube;
      said predetermined endless path including an extracting zone and an inoperative zone;
      said connecting tubes fluidly connecting said upper and lower vacuum compartments only when said connecting tubes passing said extracting zone of said predetermined endless path so that cotton fibers being extracted from cotton plants and suctioned into at least one of said upper vacuum compartment and said lower vacuum compartment through said picking fingers only when said connecting tube being in said extracting zone due to the predetermined vacuum created by said vacuum pump in said upper and lower vacuum compartments;
      said connecting tubes fluidly disconnecting said upper and lower vacuum compartments only when said connecting tubes passing said inoperative zone of said predetermined endless path.

2. The cotton picking machine as defined in claim 1, wherein said picking fingers of each of said connecting tubes extending substantially perpendicularly therefrom in parallel to each other and aligned to each other in vertical direction.

3. The cotton picking machine as defined in claim 1, further comprising a drive mechanism provided for moving said connecting tubes along said predetermined endless path.

4. The cotton picking machine as defined in claim 1, wherein each of said upper and lower compartments is provided with an elongated slot longitudinally extending along a portion of said predetermined endless path, said slot defining said extracting zone of said predetermined endless path so that when a top end of one of said connecting tubes registers with said slot in said upper vacuum compartment, a bottom end of said one of said connecting tubes registers with said slot in said lower vacuum compartment so as to provide fluid communication between said upper and lower vacuum compartments through said one of said connecting tubes.

5. The cotton picking machine as defined in claim 4, wherein slot in said upper vacuum compartment is vertically spaced and horizontally aligned with said slot in said lower vacuum compartment in the direction of said predetermined endless path.

6. The cotton picking machine as defined in claim 1, wherein said connecting tubes are movable along said predetermined endless path in said extracting zone in a direction opposite to the traveling direction of said cotton picking machine with a linear speed equal to a linear speed of said cotton picking machine in the traveling direction.

7. The cotton picking machine as defined in claim 1, wherein said extracting zone includes first and second extracting zones spaced from each other by a separating zone on one side of said endless path and by said inoperative zone on the other side of said endless path;
   said connecting tubes fluidly connect said upper and lower vacuum compartments only when said connecting tubes pass one of said first and second extracting zones of said predetermined endless path so that cotton fibers are extracted from the cotton plants and suctioned into at least one of said upper vacuum compartment and said lower vacuum compartment through said picking fingers only when said connecting tubes are in one of said first and second extracting zones due to the predetermined vacuum created by said vacuum pump in said upper and lower vacuum compartments;

said connecting tubes fluidly disconnect said upper and lower vacuum compartments only when said connecting tubes pass one of said inoperative and separating zones of said predetermined endless path.

8. The cotton picking machine as defined in claim 7, wherein each of said upper and lower compartments of said first cotton picking head is provided with first and second elongated slots each longitudinally extending along a portion of said predetermined endless path, said first slot defining said first extracting zone of said predetermined endless path and said second slot defining said second extracting zone thereof so that when a top end of each of said connecting tubes registers with one of said first and second slots in said upper vacuum compartment, a bottom end thereof registers with corresponding one of said first and second slots in said lower vacuum compartment so as to provide fluid communication between said upper and lower vacuum compartments through said one of said connecting tubes.

9. The cotton picking machine as defined in claim 1, wherein said access opening of each of said picking fingers is provided at a distal end thereof.

10. The cotton picking machine as defined in claim 1, wherein said cotton picking unit further includes a second cotton picking head structurally substantially identical to said first cotton picking head; wherein said second cotton picking head is supported by said chassis and is disposed laterally opposite said first cotton picking head in the direction transverse to said traveling direction so that cotton stalks of a cotton row pass between said first and second cotton picking heads as said cotton picking machine moves through a cotton field; and wherein said opposite first and second cotton picking heads define a center line of said cotton picking unit disposed equidistantly between said first and second cotton picking heads and extending in said traveling direction.

11. The cotton picking machine as defined in claim 10, wherein said extracting zones of said first and second cotton picking heads face each other and are disposed closer to said center line of said cotton picking unit than said inoperative zones thereof.

12. The cotton picking machine as defined in claim 10, wherein said picking fingers of said connecting tubes of said first cotton picking head passing said extracting zone of said predetermined endless path of said first cotton picking unit are facing said picking fingers of said connecting tubes of said second cotton picking unit passing said extracting zone of said predetermined endless path of said second cotton picking unit.

13. The cotton picking machine as defined in claim 10, further comprising a pair of guide elements positioned in front of said cotton picking unit and adapted to maintain cotton stalks of a cotton row in a generally upright position and to guide said cotton stalks of said cotton row between said cotton picking heads of said cotton picking unit as said cotton picking machine moves through said cotton field.

14. The cotton picking machine as defined in claim 10, wherein said picking fingers of each of said connecting tubes extending substantially perpendicularly therefrom in parallel to each other and aligned to each other in vertical direction.

15. The cotton picking machine as defined in claim 14, wherein said picking fingers of said first and second cotton picking units are disposed alternately and vertically spaced from each other.

16. The cotton picking machine as defined in claim 15, wherein said picking fingers of said first and second cotton picking heads partially laterally overlap and are vertically and axially spaced from each other.

17. The cotton picking machine as defined in claim 12, wherein each said extracting zones of each of said first and second cotton picking heads includes first and second extracting zones spaced from each other by a separating zone on one side of said endless path and by said inoperative zone on the other side of said endless path;

said connecting tubes fluidly connecting said upper and lower vacuum compartments only when said connecting tubes pass one of said first and second extracting zones of said predetermined endless path so that cotton fibers are extracted from the cotton plants passing between said first and second cotton picking heads and suctioned into at least one of said upper vacuum compartment and said lower vacuum compartment through said picking fingers only when said connecting tubes are in one said first and second extracting zones due to the predetermined vacuum created by said vacuum pump in said upper and lower vacuum compartments;

said connecting tubes fluidly disconnecting said upper and lower vacuum compartments only when said connecting tubes pass one of said inoperative and separating zones of said predetermined endless path.

18. The cotton picking machine as defined in claim 17, wherein each of said upper and lower compartments of each of said first and second cotton picking heads is provided with first and second elongated slots each longitudinally extending along a portion of said predetermined endless path, said first slot defining said first extracting zone of said predetermined endless path and said second slot defining said second extracting zone thereof so that when a top end of each of said connecting tubes registers with one of said first and second slots in said upper vacuum compartment, a bottom end thereof registers with corresponding one of said first and second slots in said lower vacuum compartment so as to provide fluid communication between said upper and lower vacuum compartments through said one of said connecting tubes.

19. The cotton picking machine as defined in claim 10, further comprising a drive mechanism provided for moving said connecting tubes of each of said first and second cotton picking heads along the corresponding predetermined endless path.

20. The cotton picking machine as defined in claim 19, wherein said drive mechanism includes a chain drive.

* * * * *